Feb. 12, 1957  G. NEUMANN  2,781,054
SELF-OPERATING CHECK VALVE
Filed Sept. 23, 1952  2 Sheets-Sheet 1

Inventor:
Gerhard Neumann,
by Paul A. Frank
His Attorney.

Feb. 12, 1957

G. NEUMANN 2,781,054

SELF-OPERATING CHECK VALVE

Filed Sept. 23, 1952

2 Sheets-Sheet 2

Inventor:
Gerhard Neumann,
by Paul A. Frank
His Attorney.

২,৭৮১,০৫৪

SELF-OPERATING CHECK VALVE

Gerhard Neumann, Cincinnati, Ohio, assignor to General Electric Company, a corporation of New York Application September 23, 1952, Serial No. 311,464

3 Claims. (Cl. 137—527.8)

This invention relates to check valves and, more particularly, to a self-operating check valve.

Check valves commonly comprise a valve disk that is disposed within a conduit or pipe which transmits fluids. The valve disk is mounted upon a shaft so that it can be rotated from the exterior of the pipe or conduit to permit the flow of fluid or to halt it as desired. In some application, however, it is very advantageous to have a check valve which operates automatically to allow flow of fluids in one direction through a pipe or conduit and which will also operate automatically to prevent fluid flow in the opposite direction.

It is therefore a principal object of the present invention to provide a simply constructed, self-acting check valve which operates automatically to allow fluid flow in one direction through a conduit or pipe and also operates automatically to prevent fluid flow in the opposite direction. A further object of the present invention is to provide a check valve which has fast, positive action not dependent upon complicated external operating mechanisms. A still further object of the present invention is to provide a light-weight check valve disk which offers a minimum amount of resistance to fluid flow when it is in its open position.

According to the present invention there is provided a self-operating check valve which comprises a valve disk rotatably mounted within a conduit through which fluids can be transmitted. The valve disk is maintained in a normally open position by the velocity head of fluid flowing through the conduit in a desired direction. If the fluid flow in the desired direction ceases and a reverse flow begins, a tab attached to the valve disk causes the disk to rotate into a closed position traversing the bore of the conduit, whereby the reverse flow is prevented.

Figure 1:
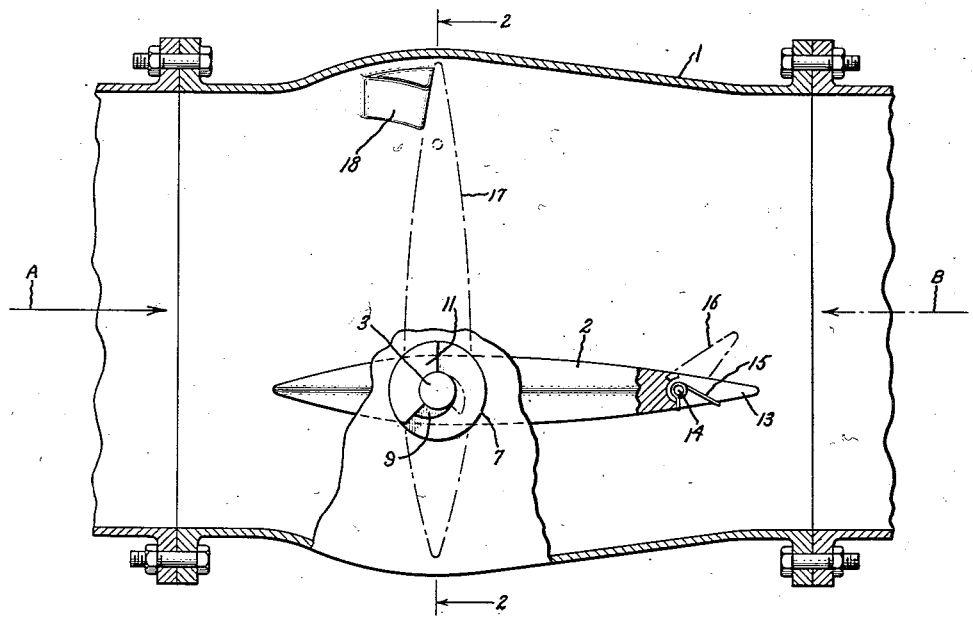
Figure 2:
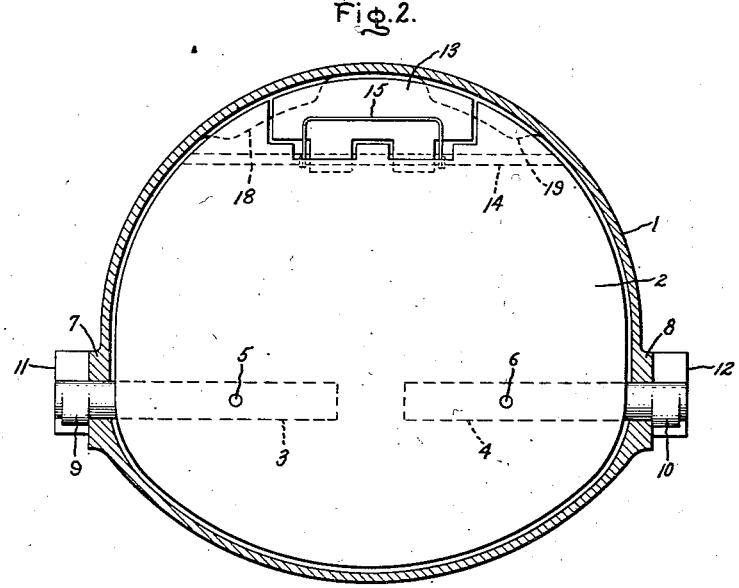
Figure 3:
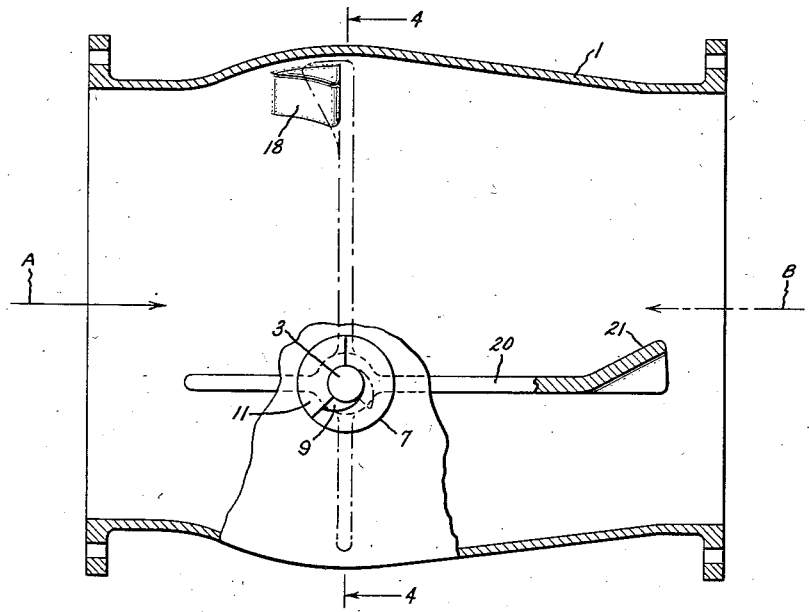
Figure 4:
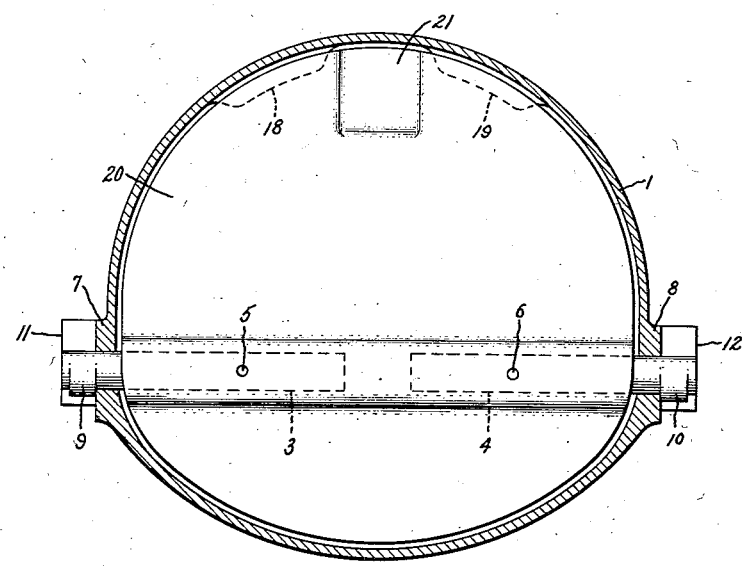

The features of the present invention will best be understood by reference to the following description taken in connection with the accompanying drawings in which Fig. 1 is a side view of a check valve according to the invention disposed within a conduit which is partly broken away; Fig. 2 is a section view taken along line 2—2 of Fig. 1 with the valve disk in closed position; Fig. 3 is a section view of another embodiment of the check valve of the invention; and Fig. 4 is a section view taken along line 4—4 of Fig. 3.

Referring particularly now to Figs. 1 and 2, there is shown according to the invention a butterfly check valve disposed within a section of conduit or pipe 1 which is adapted for the transmission of fluids, such as air, steam or combustion gases, in a desired direction indicated by the arrow labelled A. The valve includes a valve disk 2 which is rotatably mounted within conduit section 1 by means of shaft stubs 3 and 4. Shaft stubs 3 and 4 extend transversely of the conduit and may be attached to valve disk 2 by any convenient means such as rivets or bolts 5 and 6. Valve disk 2 extends on opposite sides of shaft stubs 3 and 4 and has an outer circumference conforming to the inner surface of conduit 1 so that it closes the conduit and prevents fluid flow when in a position perpendicular to the axis of the conduit as illustrated by broken line 17. The outer ends of shaft stubs 3 and 4 extend respectively through bearing members 7 and 8 and are provided near their respective extremities with boss members 9 and 10. When the valve disk is in its open position as indicated by the solid line representation in Fig. 1, bosses 9 and 10 bear respectively against fixed stop members 11 and 12 whereby rotation of the valve disk beyond a position parallel with the desired fluid flow direction is prevented. The axes of shaft stubs 3 and 4 are preferably displaced from the center line or diameter of the valve assembly for the purpose of assuring that valve disk 2 is rotated to its normally open position whenever fluid flow from the desired direction occurs.

In order to permit light-weight design for maximum strength when the valve is closed and to further assure a minimum pressure drop across the valve due to its flow resistance, valve disk 2 can have a streamlined configuration as illustrated. In practice the most satisfactory configuration can be calculated in accordance with the well-known principles of aileron and trim-tab theory. The valve disk 2 can be formed of light-weight material such as aluminum or magnesium and can be solid (as shown) or hollow.

Since it is very often desirable to prevent reverse fluid flow in conduits, valve disk 2 is provided with a spring-loaded tab 13 which is positioned near the trailing edge of disk 2 with respect to the desired direction of fluid flow. Tab 13 is rotatably mounted upon disk 2 by means of a shaft 14 that is secured to the body of valve disk 2 in any convenient manner such as by welding or riveting. A wire spring 15 having its ends circling shaft 14 and bearing at their extremities against the body of valve disk 2 as illustrated extends along the undersurface of tab 13 and tends to force tab 13 into a position projecting outwardly from valve disk 2 as indicated by the broken line at 16. The force of spring 15 is, however, arranged such that the normal velocity head due to fluid flow from the desired direction A can act to overcome the spring and force tab 13 into a position aligned with disk 2 as shown by the solid lines in Fig. 1. In the event of cessation of fluid flow in the desired direction A and the initiation of fluid flow in the reverse direction indicated by the broken-line arrow B, the velocity head of the reverse fluid flow acts against tab 13, which has meanwhile been raised by the force of spring 15 to the position indicated by broken line 16, and causes valve disk 2 to begin to rotate counter-clockwise toward its closed position shown by broken line 17. As soon as valve disk 2 rotates away from a position parallel to the direction of reverse fluid flow, it is accelerated in its counterclockwise rotation toward its closed position by the difference in pressure exerted by such flow upon the portions of valve disk 2 extending on opposite sides of shaft stubs 3 and 4. In its closed position valve disk 2 bears against streamlined stops 18 and 19 which prevent further counterclockwise rotation of the disk by the velocity head of fluid flow from the reverse direction B. It will of course be readily understood that even though the valve is in its closed position, initiation of fluid flow in the desired direction A readily causes the valve to rotate into its open position because of this same difference in pressure exerted by such desired direction flow upon the portions of valve disk 2 extending on opposite sides of the off-center axis of rotation of disk 2 provided by shaft stubs 3 and 4.

If the pressure drop across the valve is essentially unimportant and if the force of reverse fluid flow which the valve disk must withstand in its closed position is relatively small, the valve disk can consist simply of a flat plate having a spring-loaded tab similar to that illustrated in Figs. 1 and 2. As a still further simplification the valve disk may be constructed of a flat plate having a fixed tab, as shown in Fig. 3 wherein numerals employed heretofore are used to identify like elements. In this embodiment a rotatably mounted flat valve disk 20 is provided near its trailing edge with a fixed upwardly projecting tab 21. The operation of the valve of this embodiment is apparent from the foregoing description of the embodiment of Figs. 1 and 2.

While the invention has been described by reference to particular embodiments thereof, it will be understood that numerous changes may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In a conduit for the transmission of fluids in a desired direction through the conduit, a check valve comprising a valve disk rotatably mounted upon an off-center shaft extending transversely within the conduit for rotation to a normally open position with the plane of said disk essentially parallel to fluid flow by the velocity head of fluid flowing in the desired direction through the conduit on both sides of said disk, a spring-loaded tab rotatably attached to said valve disk within the periphery of said disk and maintained against the spring force with the plane of said tab essentially parallel to fluid flow by the velocity head of fluid flowing through the conduit in the desired direction and forming a streamlined configuration with said disk in said open position, said tab being deflected in a closing direction to a position other than parallel to flud flow by the spring force upon cessation of fluid flow in the desired direction whereby reversal of the fluid flow from the desired direction can initiate rotation of said disk into a closed position traversing the bore of the conduit by the force on said tab and stop means to limit rotation of said disk and said tab at said closed position of said disk.

2. In a conduit for the transmission of fluids in a desired direction through the conduit, a check valve as in claim 1 wherein the trailing edge of said spring-loaded tab is substantially flush with the trailing edge of said valve disk when in said open position with respect to fluid flow in the conduit in the desired direction to comprise a substantially streamlined configuration.

3. In a conduit for the transmission of a fluid in a desired direction therethrough, a self operating check valve comprising a valve disk indented to form a recess therein and a tab mounted in said recess, said disk being rotatable about a first axis perpendicular to the direction of fluid flow to an open position substantially parallel with said direction and to a closed position transverse to said direction, said tab being rotatable about a second axis through said disk parallel to said first axis by the velocity head of said fluid flowing in said desired direction to a first position wherein the outer surface of said tab is substantially flush with the outer surface of said disk to form with said disk a substantially streamlined configuration, said tab being spring biased to rotate about said second axis to a second position upon diminution of said velocity head wherein the outer surface of said tab diverges from the outer surface of said disk to initiate rotation of said disk upon reversal of said velocity head to close said valve without any substantial amount of reverse flow, and stop means to limit rotation of said tab and said disk at said positions.

References Cited in the file of this patent

UNITED STATES PATENTS

| 1,706,861 | Pokorny | Mar. 26, 1929 |
| 2,302,151 | Sloan | Nov. 17, 1942 |

FOREIGN PATENTS

| 75,708 | Austria | of 1919 |
| 545,879 | Germany | of 1932 |